Oct. 12, 1943. L. H. LATTA 2,331,332
FILTER MECHANISM
Filed April 16, 1942
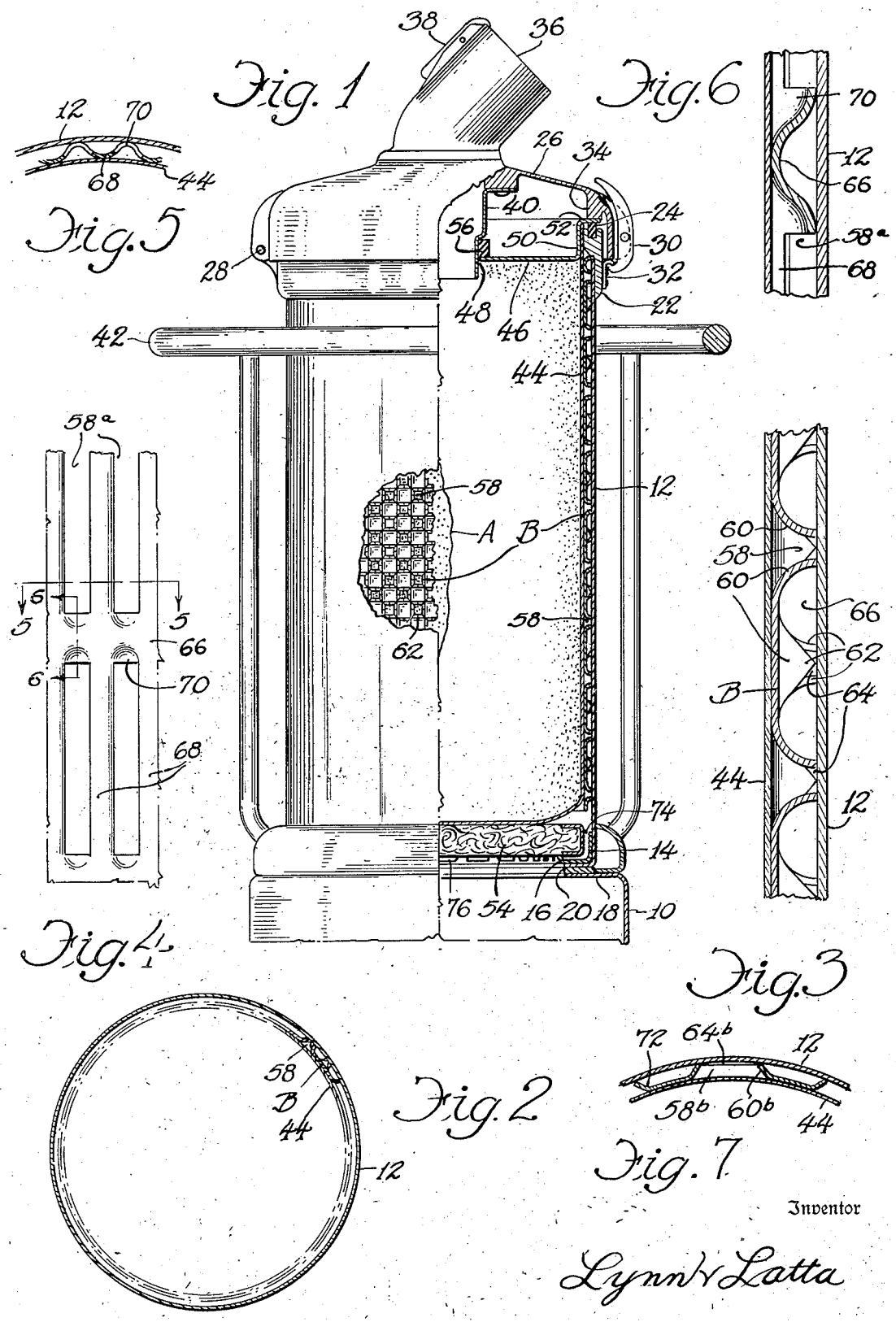
Inventor
Lynn H Latta Patented Oct. 12, 1943

2,331,332

UNITED STATES PATENT OFFICE 2,331,332

FILTER MECHANISM

Lynn H. Latta, Deerfield, Ill., assignor to Air-Way Electric Appliance Corporation, Toledo, Ohio, a corporation of Delaware Application April 16, 1942, Serial No. 439,157

9 Claims. (Cl. 183—73)

This invention relates to mechanism for filtering solids from differential pressure impelled streams of gases and has reference particularly to the air filtering and dust collecting mechanism of a vacuum cleaner of the type wherein a filtering and collecting bag of porous material, such as paper, having a relatively low tensile strength as compared to that of cloth, is supported within an imperforate casing in which suction is applied to the exterior of the bag so as to draw a dust laden air stream into the bag, a screen being interposed between the bag and the casing so as to support the bag in spaced relation to the casing wall and permit the air to freely escape from the bag.

The invention has as its general object to provide a dust collecting mechanism of the type indicated, wherein the bag may be inserted and removed without difficulty. More specifically, the invention contemplates an arrangement wherein the bag will, after being partially inserted by hand, slide smoothly into the casing under the pull of the suction unit of the cleaner.

Where screens of conventional type such as woven wire or plain perforated sheet metal are employed, difficulty is experienced in the sticking of the bag to the screen when suction is applied. This makes it more difficult to insert the bag. Also, when the bag is full, there is a likelihood of its side wall being torn during removal, against the sharp edges of openings into which it has been extruded during the filling process, or by its adherence to the relatively sharp projections of a woven screen. The present invention contemplates a screen which provides smooth, rounded surfaces against which the bag may slide without injury. To this end, I provide a screen in the form of a sleeve of sheet metal, perforated from the inside so that all sharp edges and projections are on the outer side of the screen, and the perforations are outlined by rounded surfaces curving away from the inner surface of the screen against which the bag makes contact.

Another object of the invention is to provide a dust collector in which the punched out portions of a perforated sheet metal screen serve as the means for spacing the screen from the wall of the casing and forming a plurality of air escape passages between the screen and the casing wall.

Other objects will appear when the following specification is considered in connection with the appended drawing, in which:

Fig. 1 is a side elevation of a vacuum cleaner embodying my invention, portions thereof being broken away and shown in section;

Fig. 2 is a transverse sectional view of the same;

Fig. 3 is an enlarged detail longitudinal sectional view of a portion of the screen;

Fig. 4 is an elevational view, looking at the inner surface, of a portion of a modified form of the screen;

Fig. 5 is a transverse sectional view taken on the line 5—5 of Fig. 4; and

Fig. 6 is an enlarged longitudinal sectional view taken on the line 6—6 of Fig. 4.

Fig. 7 is a transverse sectional view of a further modification of the invention.

As an example of one form in which the invention may be embodied, I have shown in Fig. 1 a vacuum cleaner embodying a base 10 housing a suction unit (not shown). On the base 10 is mounted a tubular casing 12 of the dust collector assembly. The lower end of the casing 12 is secured to a ring 14 having an inwardly extending flange 16, the latter being secured to the inturned flange 18 of the base 10, with suitable vibration absorbing washers 20 interposed therebetween.

At the upper end of the casing 12 is a mouth framed by a ring 22 sweated or otherwise suitably secured on the casing. A ring 24 of compressible material such as rubber is mounted in a groove in the ring 22 and forms a seat on which the top of the dust collecting receptacle A is supported. The mouth of the casing 12 is closed by a cover 26 hinged at 28 to the ring 22 and provided with a latch 30 adapted to coact with a hook 32 secured to the ring 22, for latching the cover in closed position. The cover 26 has an annular clamping portion 34 opposed to the bag seat 24. In the center of the cover is mounted, for swiveling movement, an elbow 36 to which a hose may be connected, as by means of a latch 38. Secured to the underside of the cover 26 and communicating with the elbow 36 is a nozzle 40 for delivering into the dust collector bag A the dust laden air stream received through the elbow 36.

Mounted on the base 10 is a hose rack 42 in which the hose may be coiled when not in use.

The dust collecting bag A includes a bag shaped body portion 44 of porous material and an end member or top 46 having an inlet 48 receiving the nozzle 40. The top 46 is dished to provide an off-set flange 50 which is received in the mouth of the body portion 44 and secured thereto as by stitching.

The periphery of the top 46 comprises a flange 52 extending outwardly beyond the wall of the body portion 44 and adapted to be clamped between the seat 24 and the clamping portion 34 of the cover.

The bottom of the bag is adapted to rest against a disc shaped pad 54 of porous material which in turn is supported upon the flange 16 of the ring 14. The nozzle 40 is provided with a gasket 56 of rubber or other suitable compressible material which is adapted to make sealing contact with the upper surface of the top 46.

The present invention provides, in combination with the above described mechanism, a screen B in a form of a sleeve, conforming in general to the contour of the interior of the casing 12, and interposed between the casing 12 and the body portion 44 of the bag A so as to permit free escape from the bag of the air passing therethrough.

Referring now to Fig. 3, the screen B is provided with a plurality of apertures or perforations 58 defined by a series of wall portions 60 punched outwardly and presenting to the bags A a series of smooth curved surfaces against which the bag will not catch.

A preferable method of perforating the screen is by the use of male die element having a series of pyramidal punch points operating against a female die member having a plurality of round openings adapted to receive the respective points, the result being that the metal in each perforation is split into a plurality of tri-angular shaped projections 62 which are spread apart to form spaces 64 through which the air passing through the perforations 58 may escape into the air passages 66 defined between the screen and the casing wall.

Where the casing 12 is cylindrical, the projections 62 serve to contact the wall of the casing 12 for spacing the screen in its proper position. Due to inaccuracies in manufacturing, the projections 62 will be somewhat nonuniform in height and accordingly the contact with the casing wall will be limited to a few of the projections.

In Figs. 4, 5, and 6 I have shown a modified form of the screen in which the apertures 58a are elongated lengthwise of the screen. In forming the apertures 58a, material is removed from the sheet of stock as contrasted to the forming of the screen B in which the material is simply split and punched to one side. There are a plurality of annular rows of the apertures 58a, adjacent rows being separated by webs 66 having outwardly curved side regions as shown.

At the ends of the apertures 58a the webs 66 of the screen are pressed outwardly to provide projections 70 which are adapted to contact the wall of the casing for spacing the screen therefrom.

The apertures 58a may extend either longitudinally or concentrically of the screen.

In the form of the invention shown in Fig. 7 the screen is provided with relatively large apertures 58b, preferably circular in shape, in the form of openings framed by continuous outwardly pressed flanges 60b. The outer edge of each flange 60b lies in a plane which assumes a chordal relationship to the curved wall of the casing 12 so as to define with the inner surface thereof accurate openings 64b through which the air may escape from the apertures into the space between the screen and the casing.

As shown in Fig. 7, the aperture framing wall portions 60b are frusto-conical, being joined to the body of the screen by curved fillet regions. In a similar manner, the aperture defining wall portions 60 in the form of the invention shown in Fig. 3 and the side extremities of the wall portions 68 of the form shown in Fig. 4 may be in the form of flat inclined portions joined to the body of the screen by curved fillet regions.

In the operation of the invention, air is drawn through the elbow 36 and nozzle 40 into the bag A. The dust carried by the air is deposited in the bag A while the air passes through the porous wall 44, then through the apertures 58, then through the spaces 64 into the air passages 66.

In the spaces 66 the air travels downwardly between the screen and the wall 12 until it escapes at the lower end of the screen.

Thence the air passes through an annular space 74 between the filter disc 54 and the casing wall and through a plurality of apertures 76 in the flange 16, into the housing 10.

I claim as my invention:

1. In a mechanism for filtering solids from differential pressure impelled streams of gases, a casing, a bag receivable in said casing, and a screen interposed between said bag and said casing, said screen being of sheet metal and having a plurality of apertures outlined by outwardly extended projecting portions of said sheet metal.

2. A filtering mechanism as defined in claim 1, wherein said projecting portions are joined to the unperforated inner surface of the screen by convex surfaces merging smoothly with said inner surface.

3. In a mechanism for filtering solids from differential pressure impelled streams of gases, a cylindrical casing, a porous bag receivable in said casing, and a cylindrical screen interposed between said bag and said casing, said screen being formed of sheet metal having a plurality of apertures defined between outwardly extended portions of said sheet metal.

4. In a mechanism for filtering solids from differential pressure impelled streams of gases, an imperforate outer casing having at one end a mouth and including a bag seat encircling said mouth, an openable cover for closing said mouth, having a clamping portion cooperable with said bag seat, a dust collecting bag having a body portion of porous material receivable in said casing and having an end member provided with a peripheral portion adapted to be clamped between said seat and said clamping portion, and a screen in the form of a sleeve of sheet metal interposed between said body portion and the wall of the casing, said screen including portions projected outwardly from the main body thereof and defining apertures in the screen, said outwardly projected portions being joined to the body portion of the screen by inclined portions adapted to facilitate sliding of the bag over said apertures.

5. A mechanism for filtering solids from differential pressure impelled streams of gases, comprising a casing, a dust collecting bag of porous paper insertable in said casing, and means for supporting said bag in spaced relationship to the inner surface of said casing, comprising a screen of apertured sheet metal interposed between the bag and the casing, said screen including wall portions extended outwardly to provide rounded aperture framing surfaces adapted to facilitate the sliding of the bag across the apertures.

6. A filtering mechanism as defined in claim 5, wherein said outwardly extended screen portions are notched to provide spaces for the escape of air from the apertures into the space between the screen and the wall of the casing.

7. A filtering mechanism as defined in claim 5, wherein at least some of said outwardly extending screen portions contact the wall of the casing to support the screen against the casing and wherein the outwardly extending portions defining each aperture are notched to provide spaces for the escape of air from the aperture into the space between the screen and the casing wall.

8. A filtering mechanism as defined in claim 5, wherein said apertures are elongated and wherein the screen is provided at the ends of the apertures with protrusions extending radially outwardly beyond the extremities of the sides of the apertures.

9. A filtering mechanism as defined in claim 5, wherein the aperture framing wall portions are continuous around each aperture, are substantially circular in shape, and have their terminal edges disposed chordally with reference to the inner surface of said casing.

LYNN H. LATTA.